United States Patent
Ueda

(10) Patent No.: US 7,391,175 B2
(45) Date of Patent: Jun. 24, 2008

(54) DEVICE AND METHOD FOR DRIVING ELECTRIC ACTUATOR

(75) Inventor: Nobumasa Ueda, Nagoya (JP)

(73) Assignee: DENSO CORPORATION, Kariya (JP)

(*) Notice: Subject to any disclaimer, the term of this patent is extended or adjusted under 35 U.S.C. 154(b) by 78 days.

(21) Appl. No.: 11/435,861

(22) Filed: May 18, 2006

(65) Prior Publication Data
US 2006/0267559 A1 Nov. 30, 2006

(30) Foreign Application Priority Data
May 25, 2005 (JP) ............... 2005-152288

(51) Int. Cl.
*H02P 7/00* (2006.01)
(52) U.S. Cl. .................. 318/432; 318/434; 318/720
(58) Field of Classification Search ........... None
See application file for complete search history.

(56) References Cited

U.S. PATENT DOCUMENTS

| | | | | |
|---|---|---|---|---|
| 4,771,843 A | * | 9/1988 | Shimizu | ............... 180/446 |
| 6,326,753 B1 | * | 12/2001 | Someya et al. | ............... 318/471 |
| 6,414,455 B1 | * | 7/2002 | Watson | ............... 318/432 |
| 2001/0026134 A1 | * | 10/2001 | Fukumoto et al. | ............ 318/430 |
| 2007/0205741 A1 | * | 9/2007 | Kaneko et al. | ............... 318/801 |

FOREIGN PATENT DOCUMENTS

JP A-2001-058578 3/2001

* cited by examiner

*Primary Examiner*—Lincoln Donovan
*Assistant Examiner*—Eduardo Colon-Santana
(74) *Attorney, Agent, or Firm*—Posz Law Group, PLC

(57) ABSTRACT

A smart actuator that includes a driving device and an electric actuator such as a DC motor includes a driving current detecting circuit, a driving circuit connected to the electric actuator, a control circuit that controls the driving circuit according to current data provided by the current detecting circuit to supply the electric actuator with a set amount of driving current when the electric actuator has a designed operating condition and a correction circuit that corrects the current data of the driving current if the operating condition is shifted from the designed operating condition to supply the set amount of driving current to the electric actuator.

12 Claims, 5 Drawing Sheets

DEVICE AND METHOD FOR DRIVING ELECTRIC ACTUATOR

CROSS REFERENCE TO RELATED APPLICATION

The present application is based on and claims priority from Japanese Patent Application 2005-152288, filed May 25, 2005, the contents of which are incorporated herein by reference.

BACKGROUND OF THE INVENTION

1. Field of the Invention

The present invention relates to a device and a method for driving an electric actuator such as a motor or a solenoid.

2. Description of the Related Art

In order to make an actuator output a prescribed torque or output power, it is necessary to supply the actuator via a driving circuit with a prescribed amount of current. However, as the output power of the driving circuit is increased, the heat value of the driving circuit increases. Therefore, it is necessary to design a heat radiation structure that corresponds to the output power of the driving circuit.

An actuator and its driving circuit, such as disclosed in JP-A-2001-58578, are separately manufactured. When such an actuator and a driving circuit are picked up from production rots to be combined to put into operation, tuning is necessary so that the actuator can output a prescribed torque because of variations of the actuator in size, resistance, material, etc. In other words, the driving circuit is required to have an excessive amount of output power capacity for the electric actuator to operate as desired.

For example, driving current of a DC motor, as one of the above stated actuator, has a linear relationship with the driving force of the motor, as shown by dotted lines in FIG. 6. When a driving circuit is designed, a minimum amount of the driving current of about 1.7 amperes for a target driving force of about 3 kgf has to be taken into account. In other words, such a driving circuit is designed to provide, as a target driving force, about 5 kgf when driving current of about 2.1 amperes is supplied to the motor. Because it is necessary to have a tolerance in amount of the input current, the maximum amount of the input current may become about 2.5 amperes. In that case, because joule heat generated in the motor increases at a rate of $(2.5/1.7)^2$, it is necessary to make the driving circuit have a large heat sink or a large heat radiation surface.

SUMMARY OF THE INVENTION

Therefore, an object of the invention is to provide a device and a method for driving an electric actuator that is compact and easy to adjust the input current to the application of the actuator.

According to a first aspect of the invention, an actuator driving device for driving an electric actuator having variations in operating conditions includes current detecting means for detecting driving current supplied to the electric actuator to provide adjusting data, a driving circuit connected to the electric actuator, a control circuit for controlling the driving circuit according to the adjusting data to supply the electric actuator with a controlled amount of driving current, and correction circuit for correcting the adjusting data of the driving current to supply the set amount of driving current to the electric actuator.

Therefore, it is not necessary to have an excessively large tolerance in amount of the input current, so that the maximum amount of the input current may not become too large. Accordingly, joule heat generated in the motor is limited, so that the driving circuit is not required to have a large heat sink or a large heat radiation surface.

In the above actuator driving device, the correction circuit may include an adjusting circuit and a processing circuit for correcting the adjusting data based on correction data. The adjusting circuit includes an interface circuit for communicating correction data with an outside device, a memory for storing the correction data and a multiplexer. The memory stores data bits and the multiplexer selects one of the adjusting data and the correction data according to the data bits.

For example, if the current data are sent to an outside device, suitable correction dada can be calculated by the outside device. The suitable correction data are stored in the memory, thereafter.

According to another feature of the invention, a method of correcting driving current of an electric actuator is comprised of the following steps of: providing current data that corresponds to a target amount of driving current when the actuator outputs a target driving force; providing correction data to adjust an actual amount of driving current to the target amount of driving current; memorizing the correction data; correcting the current data based on the correction data; and driving the electric actuator according to the corrected current data.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An electric actuator driving device according to a preferred embodiment of the invention will be described with reference to the appended drawings. Such an actuator driving device is combined with a DC motor (i.e. an actuator) to form a so-called smart actuator 1.

Figure 1:
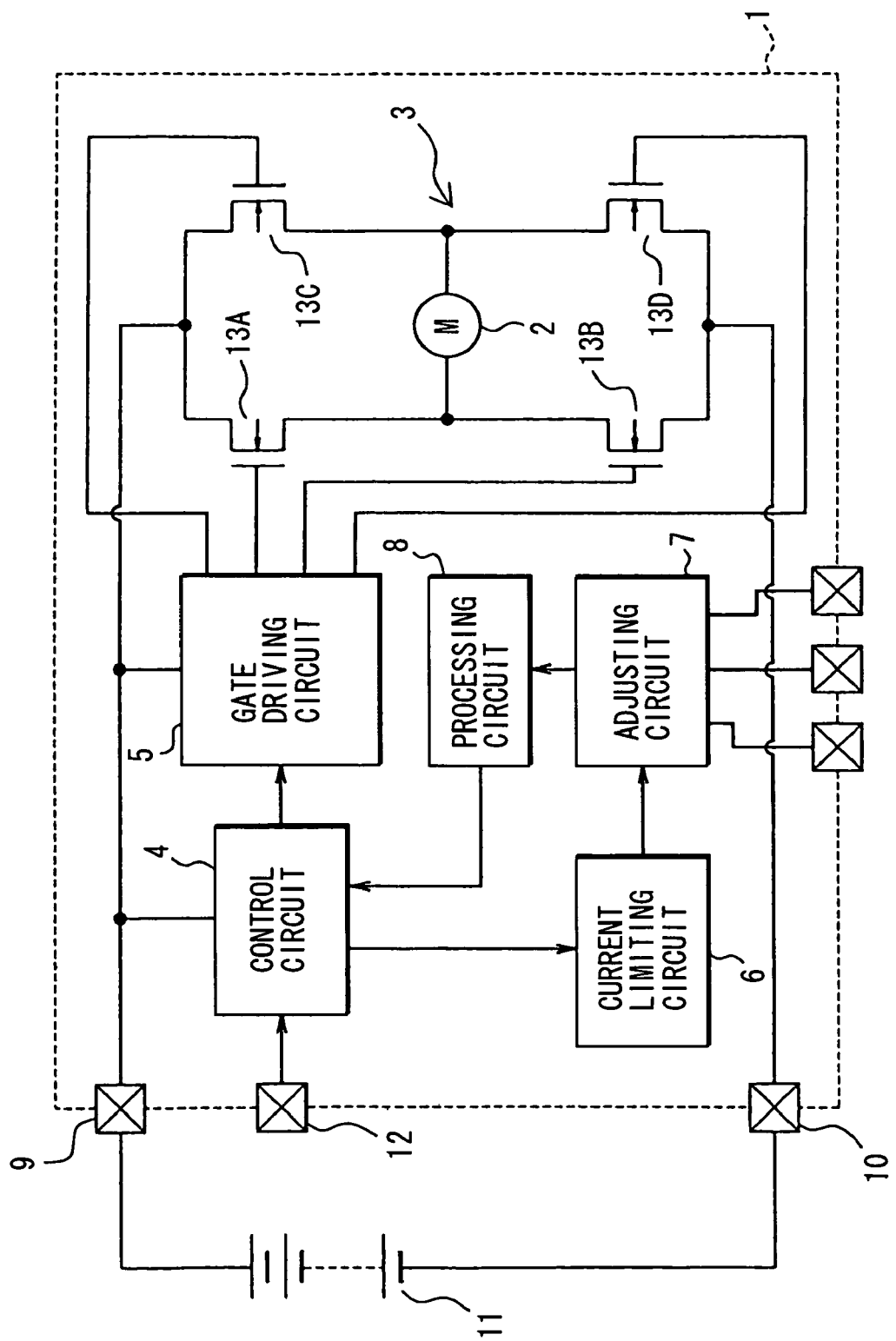
FIG. 1 is a block diagram illustrating an actuator driving circuit according to a preferred embodiment of the invention to drive an electric motor that is mounted in a vehicle.

As shown in FIG. 1, the smart actuator 1 is constituted of a DC motor 2, a motor driving circuit 3, a control circuit 4, a gate driving circuit 5, a current limiting circuit 6, an adjusting circuit 7, a processing circuit 8, a power input terminal 9, a ground terminal 10, a control terminal 12 etc. The power input terminal 9 and the ground terminal are connected to a battery 11.

The control circuit 4 provides the gate driving circuit 5 with a driving signal based on a control signal sent from an outside controller or ECU via the control terminal 12. The motor driving circuit 3 includes an H-type bridge circuit of four N-channel-power MOSFETs 13A-14D that is connected to the DC motor 2. The gate driving circuit 5 provides gates of the MOSFETs 13A-13D with driving signals. The current controlling circuit 6 provides the control circuit 4 with data corresponding to the amount of driving current via the adjusting circuit 7 and the processing circuit 8 according to detected amount of actual driving current supplied to the motor 2. Thus, the control circuit 4 controls the amount of the driving current to drive the motor 2.

Figure 2:
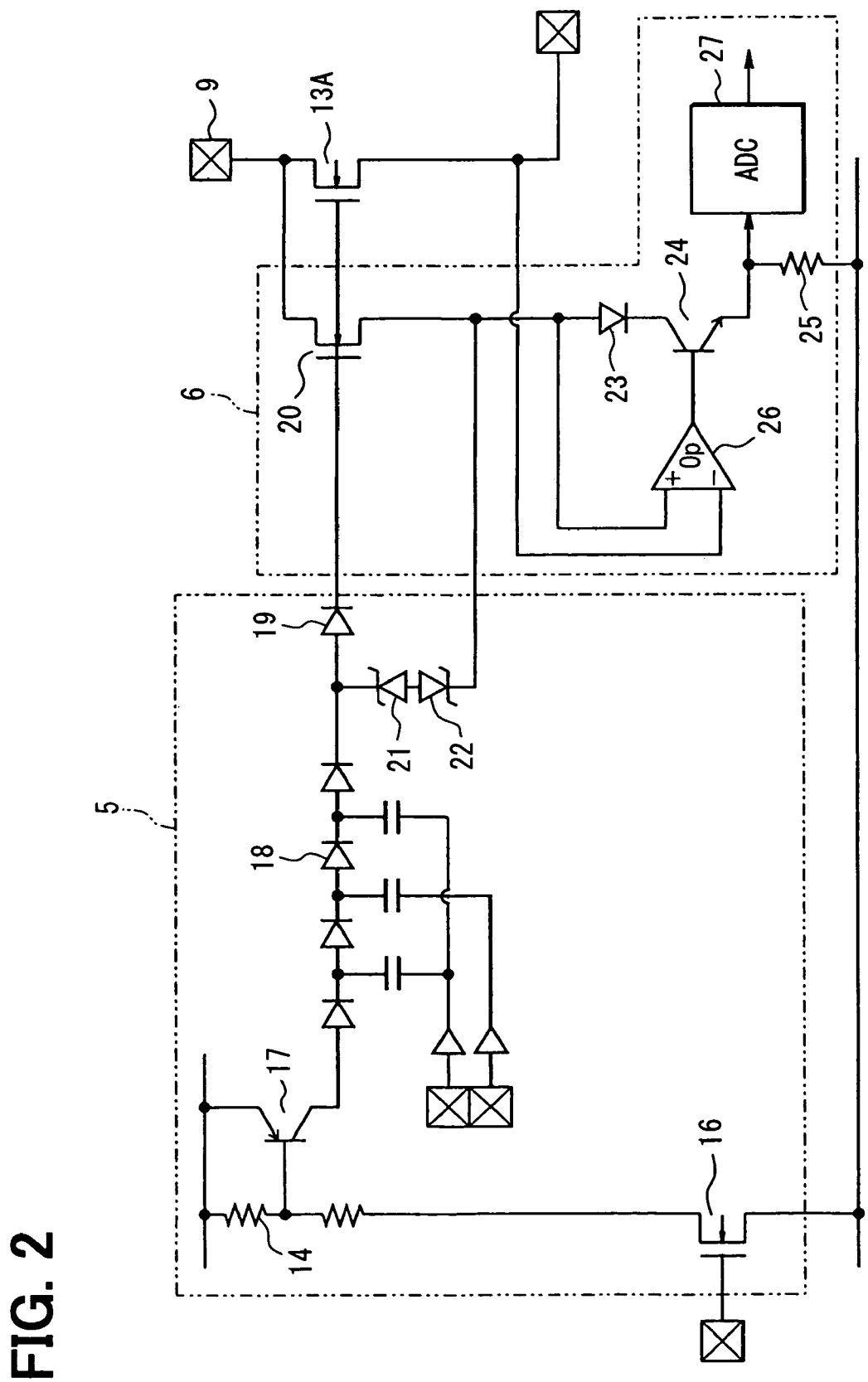
FIG. 2 is a circuit diagram illustrating a portion of a gate driving circuit and a current controlling circuit of the actuator driving circuit illustrated in FIG. 1.

As shown in FIG. 2, the gate driving circuit 5 includes a series circuit of resistors 14, 15 and an N-channel MOSFET 16, a PNP transistor 17, a booster circuit 18, diode 19, zener diodes 21, 22, etc. The series circuit of the resistors 14, 15 and the MOSFET 16 is connected between a pair of input terminals of the gate driving circuit 5. The current controlling circuit 6 includes a current detecting N-channel MOSFET 20, a diode 23, an NPN transistor 24, a resistor 25, an operational amplifier 26, an A/D converter (ADC) 27, etc.

The PNP transistor 17 has a base connected to the junction of the series connected resistors 14, 15, an emitter connected to a power line and a collector connected to the gate of the FET 13A via the booster circuit 18 and the diode 19.

The FET 13A has a drain connected to the drain of the FET 20 and a gate connected to the gate of the FET 20. The zener diodes 21, 22 are connected back-to-back to each other between the anode of the diode 19 and the source of the FET 20. The booster circuit 18 is constituted of a charge pump circuit that includes a plurality of diodes and a plurality of capacitors to raise the gate voltage of the FET 13A and the FET 20.

The source of the FET 20 is connected to the non-inverted terminal of the operational amplifier 26 and is grounded via the diode 23 and the collector-emitter path of the PNP transistor 24 and the resistor 25. The inverted terminal of the operational amplifier 26 is connected to the source of the FET 13A, and the output terminal thereof is connected to the base of the transistor 24. The emitter of the transistor 24 is connected to the input port of the A/D converter 27.

When a gate signal, which is a high level signal, is applied to the gate of the FET 16, the FET 16 opens to turn on the transistor 17. Consequently, a gate driving voltage is applied to the gates of the FET 13A and the FET 20 to turn on the FET 13A and the FET 20. The FET 13A and the FET 20 form a current mirror circuit in which the ratio of the current flowing through one of the FET 13A and the FET 20 to the current flowing through the other is, for example, 1000:1. Because the operational amplifier 26 functions as an imaginarily short-circuit so as to equalize the drain voltage of both FETs 13A, 20, the ratio of the current is maintained unchanged even if the resistor 25 is connected to the side of the FET 20.

If both the FET 13A and the FET 20 are turned on, the current flowing through the FET 20 also flows through the diode 23, the collector-emitter path of the transistor 24 and the resistor 25. The voltage drop across the resistor 25 is converted by the A/D converter 27, so that digital current data that correspond to the amount of the detected current can be provided at the adjusting circuit 7.

Figure 3:
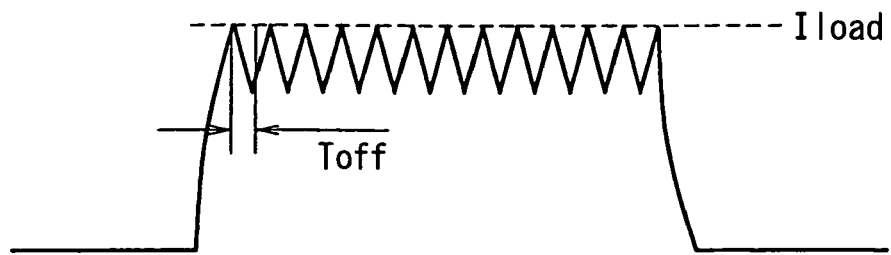
FIG. 3 is a graph illustrating a wave shape of driving current.

The control circuit 4 reads the current data converted by the A/D converter 27 therein via the adjusting circuit 7 and the processing circuit 8. The control circuit 4 turns off the gate driving circuit 5 when the current data reaches a predetermined amount $I_{load}$. Because the DC motor is an inductive load, the driving current does not immediately become zero but gradually decreases at a rate of its time constant. When a time $T_{off}$ has passed, the control circuit 4 turns on the gate driving circuit 5 again to supply a controlled amount of the driving current to the DC motor 2. As a result, the driving current is controlled in a manner shown in FIG. 3.

Figure 4:
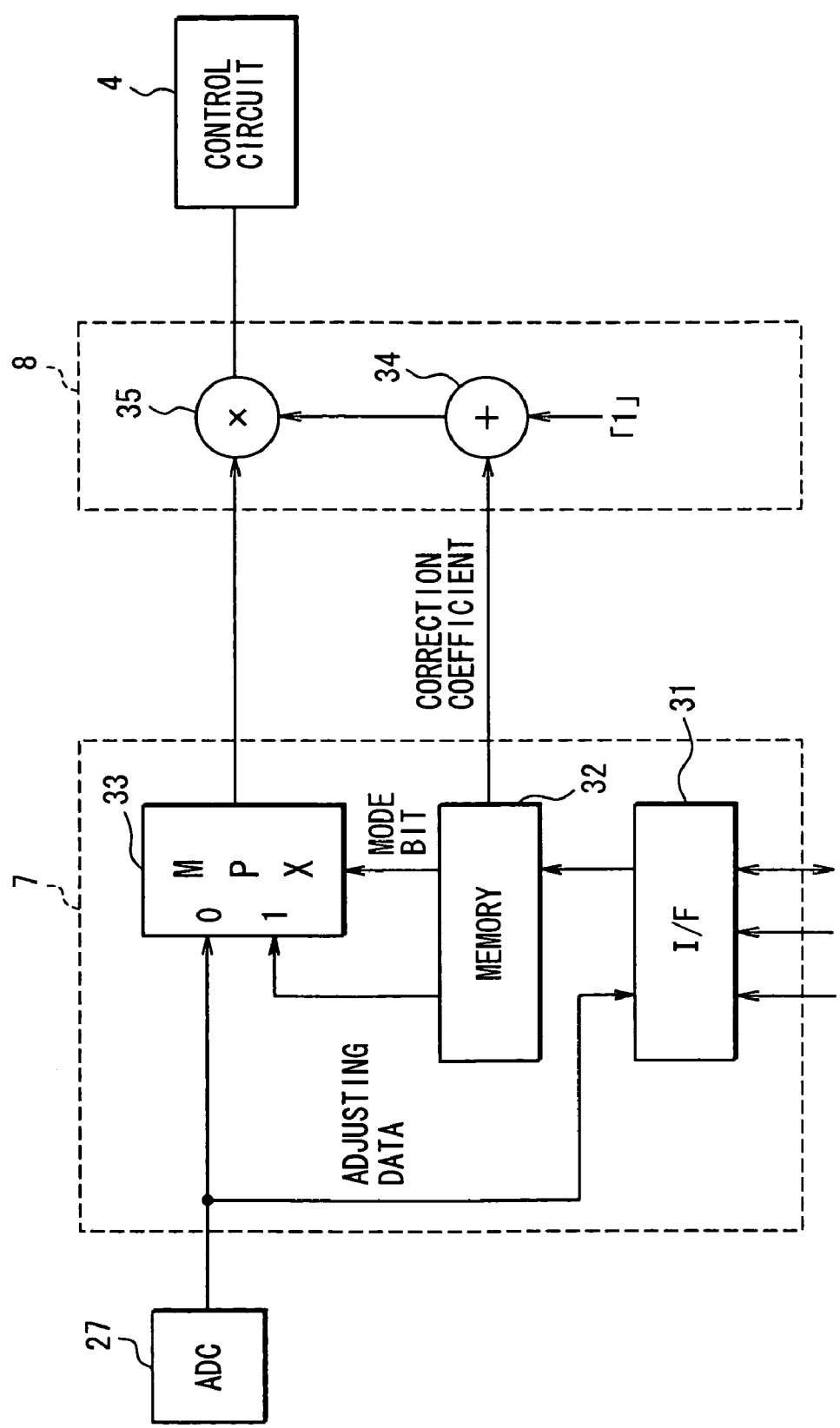
FIG. 4 is a block diagram illustrating an adjusting circuit and a processing circuit of the actuator driving circuit illustrated in FIG. 1.

As shown in FIG. 4, the adjusting circuit 7 is constituted of a serial interface (I/F) 31, a memory 32 and a multiplexer (MPX) 33. The processing circuit 8 is constituted of an adder 34 and a multiplier 35. The serial I/F 31 is an interface to have a serial communication with an outside device. That is, data sent from the outside device are stored into the memory 32 via the serial I/F 31, which can carry out a parallel-to-serial conversion of the output data of the A/D converter 27.

The memory 32 is a nonvolatile memory, such as an EEPROM, an EPROM, a flash ROM, a ferroelectric RAM or a magnetoresistive RAM. The data written into the memory 32 are outputted and available whenever it is connected to a power source. The memory 32 includes an adjusting data storing region, correction coefficient data storing region and a mode-bit storing region. Corresponding data are selected by respective address and stored therein via the serial I/F 31. However, the mode bit may be stored at the same time when data are stored into one of the storing regions. The correction coefficient data are treated as coded data.

The adjusting data stored in the memory 32 is outputted to one of the input terminals of the multiplexer 33, and the correction coefficient data are outputted to the adder 34 of the processing circuit 8. The mode bit is outputted to switch the operation of the multiplexer 33 one to another. In other words, the multiplexer 33 selects one of the output data (current data) of the A/D converter 27 and the adjusting data stored in the memory 32 by "0" or "1" of the mode bit and sends the selected data to the adder 35 of the processing circuit 8.

In the processing circuit 8, the adder 34 adds a fixed data value "1" to the adjusting data stored in the memory 32 and sends the resultant data to the adder 34. The multiplier 35 multiplies the output data of the multiplexer 33 by the output data of the adder 34 and sends the resultant data to the control circuit 4.

Figure 5:
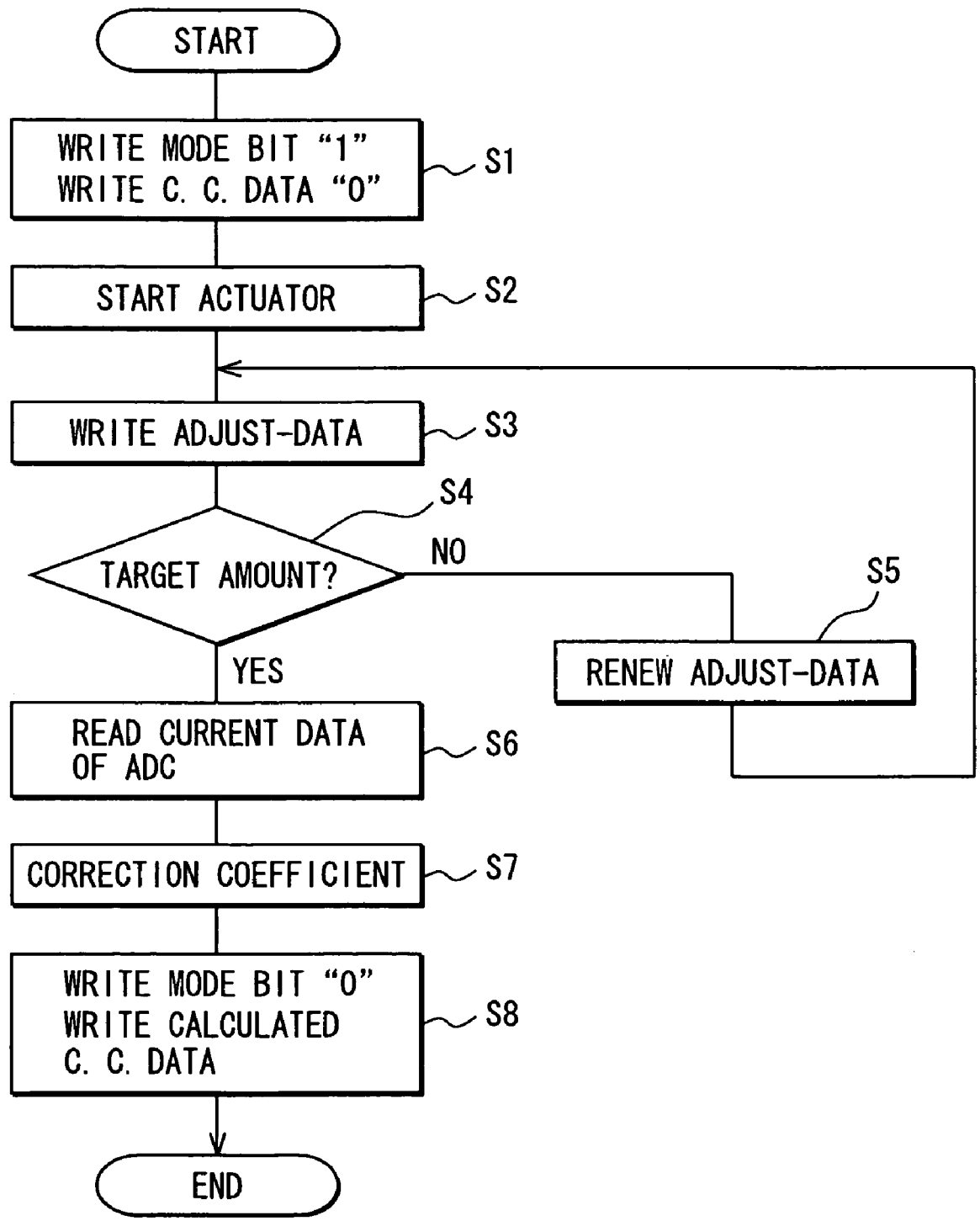
FIG. 5 is flow diagram showing steps of user's work for determining correction coefficients to be stored in a memory.

As shown in FIG. 5, a user takes steps to determine correction coefficient data to be stored into the memory. At first step S1, the user sets a mode bit "1" of the memory 32 via the serial I/F 31 and stores a correction coefficient data "0" therein. Then, the multiplexer 33 of the adjusting circuit 7 selects the side of the adjusting data outputted from the memory 32. Because the correction coefficient data is "0", the processing circuit 8 outputs the adjusting data that has been outputted from the memory 32 without any change.

Subsequently, the smart actuator is started by the control circuit 4 at step S2. Then, the adjusting data are written into the memory 32 at step S3. Thereafter, the amount of the driving current of the DC motor 2 is directly detected by the use of a current transformer or the like to examine if a target amount of driving current is supplied to the DC motor 2 or not. Incidentally, the driving current may be calculated based on the driving force and the rotation speed of the DC motor, which may be detected by a rotary encoder or a hall IC. Incidentally, the actual driving force and the actual driving current are measured before the DC motor 2 is mounted in a vehicle.

If the result of the examination is NO, the adjusting data are renewed at step S5 and the control process returns to the step S3 thereafter, whereby the adjusting data stored in the memory 32 is renewed. If, on the other hand, the result of the examination is YES, or the driving current has a target amount of current, the user reads the output data of the AD converter 27 via the serial I/F 31 at step S6. Then, the correction coefficient data are calculated based on a designed value data, which are provided as a condition for the control circuit 4 to provide the target amount driving current, and the above output data of the AD converter 27 at step S7. When the correction coefficient data are calculated, the user sets the mode bit of the memory 32 to "0" via the serial I/F 31, and write the calculated correction coefficient data into the memory 32 at step S8. As a result, the multiplexer 33 of the adjusting circuit 7 selects the output data side of the A/D converter 27, and the processing circuit 8 provides the control circuit 4 with adjusting data that are the products of the above data and (1+a correction coefficient). Thus, the control process ends.

Assuming that: the A/D converter 27 is a 10-bit-converter that operates at 5 V; the analog output characteristic of the operational amplifier 26 is 1V/1 A; and the target amount of the current that is necessary to provide an output torque of the DC motor is 2.000 A. The expectation value (designed value) of the voltage to be inputted to the AID converter 27 is 2.000 V.

If the actual input voltage becomes 1.900 V (5% less) due to variations in operating conditions such as circuit conditions, the digital data value to be converted is $1.900/5.000 \times 2^{10} = 389$ If the input voltage is 2.000 V, the output of the control circuit is $2000/5.000 \times 2^{10} = 410$ In other words, it is necessary to give a feedback data (expectation value) of "410" if the control circuit expects the driving current of 2.000 A. Therefore, the correction coefficient data are set as follows.

$$410/389 - 1 = 0.0540$$

Accordingly, the output adjusting data of the processing circuit 8 that corresponds to the digital data 389 is:

$$389 \times (1 + 0.0540) = 410$$

Figure 6:
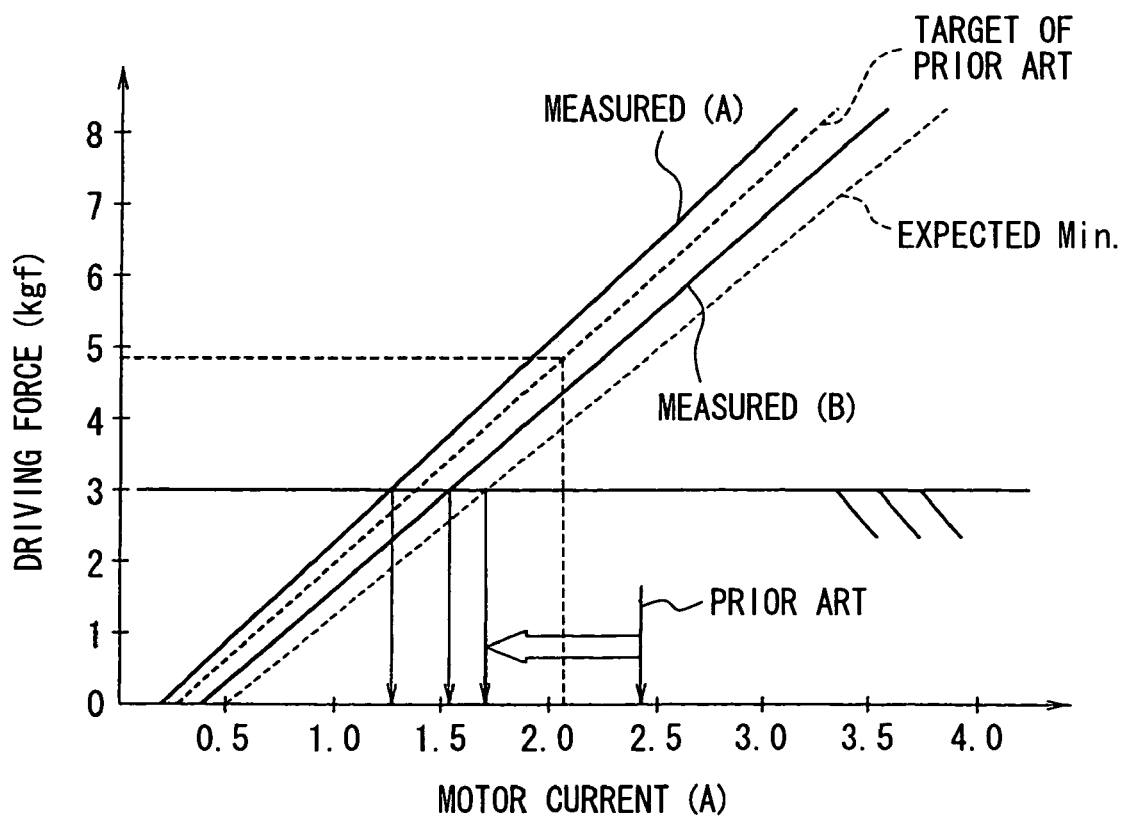
FIG. 6 is a graph showing a relationship between motor driving current of the actuator driving circuit according to the preferred embodiment of the invention and motor driving force thereof.

Thus, the actuator can be driven as designed or expected by adding a small amount of driving current even if the actual driving force of the DC motor 2 is a minimum value of the target driving force. Because it is not necessary to have a large amount tolerance in the input current, the maximum amount of the input current can be significantly reduced as shown in FIG. 6.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An actuator driving device for driving an electric actuator having variations in operating conditions to provide a set driving force, the actuator driving device comprising:
   current detecting means for detecting an amount of driving current supplied to the electric actuator to provide current data;
   a driving circuit connected to the electric actuator to drive the electric actuator;
   a control circuit for controlling the driving circuit according to the current data to supply the electric actuator with a controlled amount of driving current; and
   correction means for correcting the current data so that the control circuit controls the driving circuit to supply the set amount of driving current to the electric actuator to provide the set driving force, the correction means including an adjusting circuit that provides correction data and a processor circuit that changes the current data according to the correction data,
   wherein the adjusting circuit comprises a memory that stores the correction data that are adjusted in advance.

2. The actuator driving device according to claim 1, wherein;
   said adjusting circuit further comprises an interface circuit for inputting adjusting data therein from an outside device and means for selecting the correction data from portions of the adjusting data until the actuator provides the set driving force.

3. The actuator driving device according to claim 2, wherein
   said memory further stores a data bit and the adjusting data; and
   said means for selecting comprises a multiplexer that selects one of the adjusting data and the current data according to the data bit.

4. The actuator driving device according to claim 1, wherein the memory is a nonvolatile memory.

5. The actuator driving device according to claim 4, wherein the memory is one of an EEPROM, an EPROM, a flash ROM, a ferroelectric RAM or a magnetoresistive RAM.

6. A method of adjusting driving force of an electric actuator comprising the step of:
   providing current data that correspond to a target amount of driving current when the actuator outputs a target driving force in advance;
   providing correction data to adjust an actual amount of driving current to the target amount of driving current;
   memorizing the correction data;
   correcting the current data based on the correction data;
   driving the electric actuator according to the corrected current data.

7. A method of correcting driving current of an electric actuator according to claim 6, wherein the step of providing correction data further comprises the steps of:
   supplying the electric actuator with driving current that corresponds to a temporary data;
   examining if the amount of driving current of the electric actuator is a the target amount or not; and
   providing the correction data if the amount of driving current of the electric actuator is the target amount.

8. The method of correcting driving current of an electric actuator according to claim 6, wherein the memorizing the correction data comprises storing the correct on data in a nonvolatile memory.

9. The method of correcting driving current of an electric actuator according to claim 8, wherein the nonvolatile memory is one of an EEPROM, an EPROM, a flash ROM, a ferroelectric RAM or a magnetoresistive RAM.

10. A method of driving an electric actuator comprising the steps of:
    storing a plurality of adjusting values into a memory;
    temporarily supplying an mount of driving current to the electric actuator according to one of the adjusting values;
    examining if the amount of driving current is a target amount or not;
    renewing the one of the adjusting values to another until the electric actuator is supplied with the target amount of the driving current;

memorizing the finally renewed one of the adjusting value into the memory; and supplying the driving current to the electric actuator according to the finally renewed one of the adjusting value outputted from the memory.

11. The method of driving an electric actuator according to claim 10, wherein the memory is a nonvolatile memory.

12. The method of driving an electric actuator according to claim 11, wherein the memory is one of an EEPROM, an EPROM, a flash ROM, a ferroelectric RAM or a magnetoresistive RAM.

* * * * *